United States Patent
Trowbridge (10) Patent No.: US 10,438,404 B2
(45) Date of Patent: Oct. 8, 2019

(54) AMBIENT LIGHT CHARACTERIZATION

(71) Applicant: Disney Enterprises, Inc., Burbank, CA (US)

(72) Inventor: Robert Scott Trowbridge, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 60 days.

(21) Appl. No.: 15/783,247

(22) Filed: Oct. 13, 2017

(65) Prior Publication Data

US 2019/0114828 A1    Apr. 18, 2019

(51) Int. Cl.
| | |
|---|---|
| *G06T 15/80* | (2011.01) |
| *G06T 19/00* | (2011.01) |
| *H04B 10/116* | (2013.01) |
| *G06T 15/50* | (2011.01) |

(52) U.S. Cl.
CPC ............ *G06T 15/80* (2013.01); *G06T 15/506* (2013.01); *G06T 19/006* (2013.01); *H04B 10/116* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 8,405,680 | B1 | 3/2013 | Cardoso Lopes et al. |
| 8,872,853 | B2 | 10/2014 | Sugden et al. |
| 9,132,342 | B2 | 9/2015 | Balachandreswaran et al. |
| 9,269,022 | B2 | 2/2016 | Rhoads et al. |
| 9,428,054 | B2 | 8/2016 | Tuukkanen |
| 2014/0186026 | A1* | 7/2014 | Oshima ................ H04B 10/116 398/25 |
| 2014/0199078 | A1* | 7/2014 | Lim ..................... H04B 10/116 398/103 |

(Continued)

FOREIGN PATENT DOCUMENTS

EP    2767845 A1    8/2014

OTHER PUBLICATIONS

P. Salunkhe, S. Mahadik, "Application of Li-Fi in Augmented Reality Exhibitions", International Journal of Current Trends in Engineering & Research (IJCTER), vol. 2, issue 6, Jun. 2016, pp. 313-320.

(Continued)

*Primary Examiner* — Frank S Chen
(74) *Attorney, Agent, or Firm* — Patterson + Sheridan, LLP (57) ABSTRACT

Embodiments herein describe an AR system which communicates with light sources in a real world environment to simulate the light sources having an effect on AR content being displayed in the AR system. In one embodiment, the AR system determines the light characteristics of the light sources such as their color, specularity, beam spread, brightness, or illumination pattern. These light characteristics can contribute to the ambient light in the real world environment which affects the appearance of the physical objects in the environment. The AR system can adjust how the AR content is displayed to simulate the AR content being affected in a similar manner by the light sources. As such, the AR content appears to be more like a physical object (rather than a virtual object) thereby providing the user with a more immersive experience.

18 Claims, 7 Drawing Sheets

(56) References Cited

U.S. PATENT DOCUMENTS

| | | |
|---|---|---|
| 2015/0130355 A1 | 5/2015 | Rains, Jr. et al. |
| 2016/0173200 A1* | 6/2016 | Chaillan .............. H04B 10/116 |
| | | 398/115 |
| 2016/0202081 A1 | 7/2016 | Debieuvre et al. |
| 2016/0223986 A1 | 8/2016 | Archambeau et al. |
| 2016/0350967 A1* | 12/2016 | Klassen .................. G06T 15/60 |

OTHER PUBLICATIONS

G. Povey, "Augmented Reality using VLC—Visible Light Communication is an ideal technology to enable Augmented Reality applications for indoor environments", retrieved Nov. 8, 2016 from http://visiblelightcomm.com/augmented-reality-using-vlc, 5 pages.

C. Mercer, "Eight brilliant uses of Li-Fi: How could Li-Fi be used? Here's how Li-Fi could influence internet connectivity", retrieved Nov. 8, 2016 from http://www.techworld.com/picture-gallery/big-data/-brilliant-uses-of-li-fi-3636688/, 2 pages.

\* cited by examiner

AMBIENT LIGHT CHARACTERIZATION

BACKGROUND

Field of the Invention

The embodiments herein are generally directed to characterizing an effect of a light source in a real world environment on augmented reality (AR) content displayed using an AR system.

Description of the Related Art

AR displays insert virtual content into real-world views of the user's environment. For example, a user may wear a headset that captures views of the real world and includes a lens and a display device that outputs AR content. For example, the AR content may include a virtual object such as a cartoon character that is inserted into the real world environment. The AR display can cause the cartoon character to move and interact with physical objects in the real world environment such as standing on a table, climbing on a box, etc.

In some AR systems, the appearance of the AR content is improved by first occluding a portion of the real-world image before combining the real-world image and the AR content. For example, the AR display can control a first display to generate an opaque portion with the same outline as the cartoon character. Because the AR content is combined with the real-world image at the location of the black silhouette, the appearance of the AR content is more vibrant, high-contrast, and can include the color black. Although this technique can make the AR content appear more realistic, it does not consider the ambient light. For example, a light source in the real world environment can be a colored light source (e.g., a red or blue light) or flicker according to a predefined pattern (e.g., simulating a candle). If the AR content is displayed without considering the ambient light in the room, the AR content may stand out from the physical objects in the real world environment thereby harming the immersive experience provided by AR.

SUMMARY

One embodiment described herein is an AR system that includes a display configured to output AR content to overlay a portion of a real world environment viewable through the display and a visible light communication (VLC) communicator configured to receive VLC signals transmitted from a VLC light source in the real world environment where the VLC signals comprise data indicating light source characteristics of the VLC light source. The AR system includes an AR generator configured to determine, based on the light source characteristics, display characteristics for the AR content to simulate an effect of the VLC light source on the AR content.

Another embodiment described herein is computer-readable storage medium having computer-readable program code embodied therewith, the computer-readable program code, when executed by a processor, performs an operation. The operation includes outputting AR content in a display where the AR content overlays a portion of a real world environment viewable through the display. The operation also includes receiving data transmitted from a VLC light source in the real world environment using VLC signals where the data comprises light source characteristics of the VLC light source, and determining, based on the light source characteristics, display characteristics for the AR content to simulate an effect of the VLC light source on the AR content.

Another embodiment described herein is an intelligent light source and an AR system. The AR system includes a display configured to output AR content to overlay a portion of a real world environment viewable through the display, a communicator configured to receive signals transmitted from the intelligent light source where the signals comprise data indicating a light source characteristic of the intelligent light source, and an AR generator configured to determine, based on the light source characteristic, display characteristics for the AR content to simulate an effect of the intelligent light source on the AR content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe an AR system which communicates with light sources in a real world environment to simulate the real world light sources having an effect on AR content being displayed in the AR system, and virtual light sources having an effect on real world lighting. In one embodiment, the AR system determines the light characteristics of real-world light sources such as their color, specularity, beam spread, brightness, or illumination pattern (e.g., a flicker). These light characteristics can contribute to the ambient light in the real world environment which affects the appearance of the physical objects in the environment. For example, a red light may cause the physical objects to have a reddish hue while a flickering light source causes the brightness of the light reflected by the physical objects to change. Once the light characteristics of the light sources are identified, the AR system can adjust how the AR content is displayed to simulate the AR content being affected in a similar manner by the light sources. For example, by identifying a red light source, the AR system can display the AR content with a similar reddish hue. In this manner, the AR content appears to be more like a physical object (rather than a virtual object) thereby providing the user with a more immersive experience.

In one embodiment, the AR system identifies a location of the light sources. Thus, as the AR content moves in the real world environment, the AR system can update the display characteristics of the AR content as its proximity to the light sources and the characteristics of those light sources changes. For example, if the AR content moves closer to a light source, the AR system can increase the brightness of the side of the AR content facing the light source. In another embodiment, the AR system can use locations of the light sources and the physical objects to identify shadows in the real world environment and update the display characteristic of the AR content when it moves into a shadow.

In one embodiment, the AR system uses visible light communication (VLC) to communicate with the light sources. The AR system can use a customized or proprietary VLC technique or a standardized VLC technique such as Li—Fi (which is defined by IEEE 802.15.7r1). In any case, the AR system can use VLC to receive the light characteristics of the light sources as well as send commands to the light source in order to, for example, determine a location of the light sources in the environment. In another embodiment, instead of using VLC, the AR system can use a different type of communication technique to communicate with intelligent light sources, such as Internet of Things (IoT) communication protocol(s).

In another embodiment, the AR system simulates an effect of an AR lighting event on real world objects using the physical light sources in the environment. For example, if the AR lighting event emits light such as lighting a virtual fire, turning on a virtual light, setting off virtual fireworks, and the like, the AR system can communicate lighting characteristics corresponding to the AR lighting event to a VLC light source. In response, the VLC light source can alter its lighting characteristics (or the lighting characteristics for a different light source) so that it appears that the real world objects are affected by the AR lighting event. For example, the VLC light source may change its color, specularity, beam spread, brightness, or illumination pattern.

Figure 1:
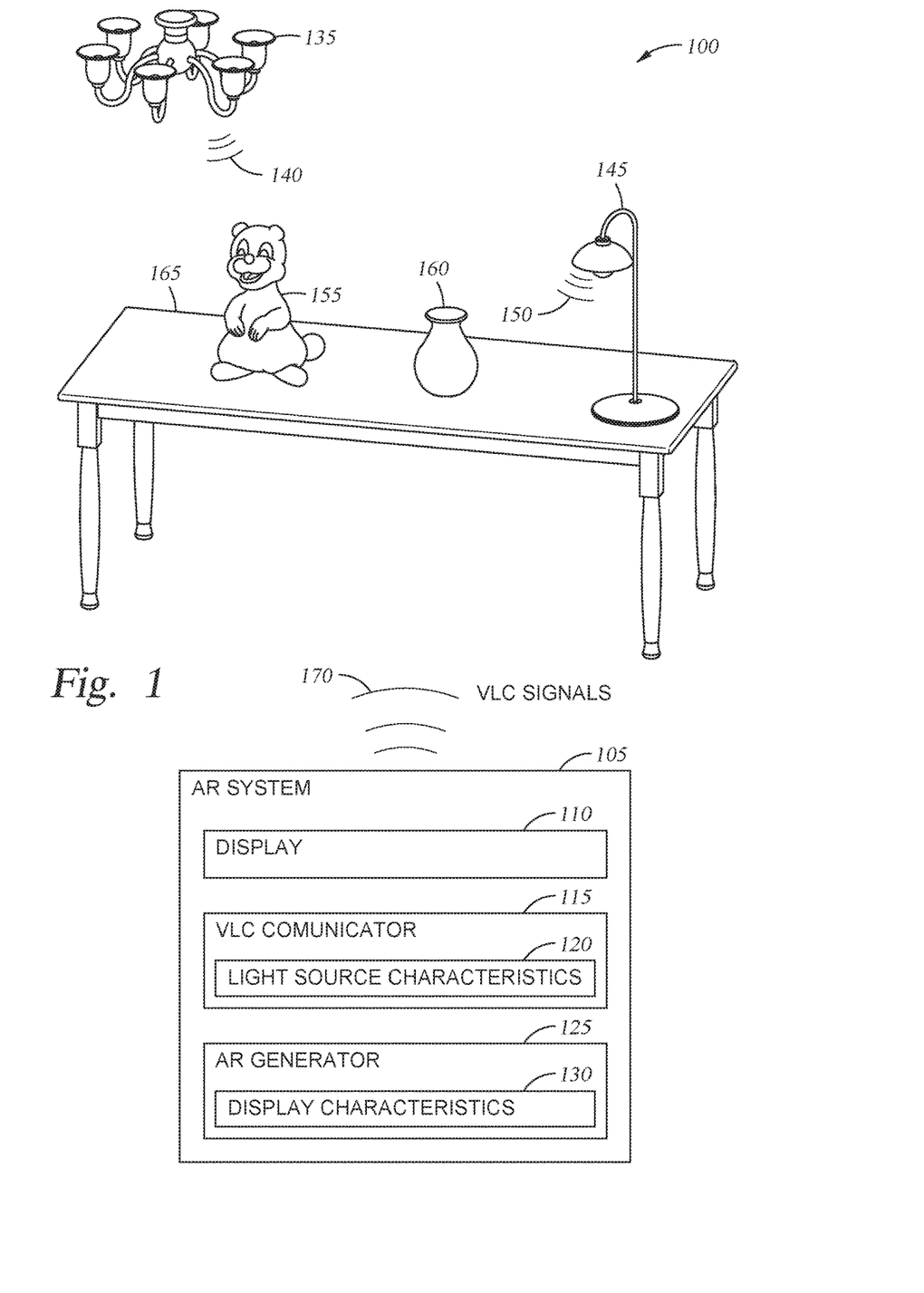
FIG. 1 is a system diagram of an AR system communicating with light sources to display AR content, according to one embodiment described herein.

FIG. 1 is a system diagram of an AR system 105 communicating with VLC light sources in a real world environment 100 to display AR content, according to one embodiment described herein. The AR system 105 includes a display 110, a VLC communicator 115, and an AR generator 125. In one embodiment, the AR system 105 and its components may be implemented in a head mounted display (HMD). The HMD can also include a battery pack and the necessary antennas and sensor for performing wireless data communication with a network (e.g., a wide access network) and with the VLC light sources.

In one embodiment, the display 110 includes a transmissive screen that permits light emitted by the VLC light sources 135 and 145 to pass through. Thus, when viewing the real world environment 100 through the transmissive screen, the user can see physical objects in the environment 100 such as physical objects 160 and 165 (e.g., a vase sitting on a table) in a similar state as if she was not wearing the HMD. That is, the physical objects 160 and 165 can appear the same as if the user was viewing the objects with her naked eye.

The AR generator 125 can display AR content 155 onto the transmissive screen in the display 110. Moreover, the AR generator 125 can control the size and the location of the AR content 155 in the display 110 so that the AR content 155 appears to be at a desired or simulated location in the real world environment 100. Stated differently, the AR content 155 overlays (or at least partially occludes) a portion of the real world environment 100. In this example, the AR content 155 is displayed such that it appears the content 155 (e.g., a cartoon character) is standing on the physical object 165, although in reality the AR content 155 is viewable only when the user looks through the display 110. Thus, unlike virtual reality, augmented reality can integrate virtual objects (e.g., the AR content 155) into a real world environment.

In another embodiment, the AR system 105 may include a camera for capturing an image of the real world environment. The AR generator 125 can insert AR content into the image of the real world environment which is then displayed to the user. In this embodiment, the display 110 is not transmissive. For example, the AR system 105 could be a mobile phone where the display of the mobile phone outputs the images containing the AR content integrating into the real world environment.

Although not shown, in one embodiment, the AR system 105 includes object detection sensors such as depth of field sensors, time of flight sensors, infrared light sensors, and the like in order to detect the physical objects 160 and 165 and their relative locations to the AR system 105. With this information, the AR generator 125 can move the AR content 155 so it can interact with the physical objects 160 and 165 such as climbing onto the vase or jumping off the table. Moreover, if the AR system 105 is a HMD, the AR generator 125 can update the location of the AR content 155 in the display 110 such that the content 155 appears to remain stationary in the real world environment 100 as the user moves the HMD (so long as the desired location of the AR content 155 in the real-world environment 100 remains viewable in the display 110). In another example, the location of the AR content 155 in the real world environment may move as the user moves the AR system 105—e.g., the AR generator 125 can illustrate an animation of the AR content 155 flying in the display 110 in order to maintain the AR content 155 in the portion of the real world environment 100 currently being viewed by the user. In this manner, the AR generator 125 can identify a location in the display 110 to display the AR content 155 which, to the perspective of the user, inserts the AR content 155 at a desired (or simulated) location in the real world environment. As discussed in more detail below, the AR generator 125 can use display characteristics 130 to control how the AR content 155 is illuminated in the display 110 in order to simulate the AR content 155 being affected by the VLC light sources 135 and 145.

The VLC communicator 115 in the AR system 105 communicates with the VLC light sources 135 and 145 in the real world environment 100. In one embodiment, the VLC communicator 115 uses a customized or proprietary VLC technique to communicate with the light sources 135 and 145. Alternatively, the communicator 115 can use a standardized VLC technique such as Li-Fi. VLC is a data communications variant which uses visible light between 400 and 800 THz (780-375 nm) to transmit data. VLC typically relies on line of sight (LOS) in order to transmit data signals since visible light cannot penetrate opaque materials. The VLC light sources 135 and 145 can be, for example, fluorescent lamps which transmit data up to 10 kbits/s or light emitting diodes (LEDs) which transmit data up to 500 Mbits/s. In another embodiment, the VLC light source 135 and 145 may be a media source such as a television, a media projector, or a computer display. As the media content on the media source changes, the media source can inform the AR system the color and intensity of the light being emitted by the media source.

In one embodiment, the light sources 135 are modulated such that the brightness is changed in order to transmit data. For example, the light sources 135 and 145 may rapidly change their brightness (at a rate that is imperceptible to the human eye) in order to transmit VLC signals 140 and 150 to the AR system 105. The light sources 135 and 145 can transmit data signals to the AR system 105 while providing ambient light for the real world environment 100. The VLC communicator 115 may include a photodetector and demodulator for detecting and decoding the data in the VLC signals 140 and 150.

The VLC light sources 135 and 145 use the VLC signals 140 and 150 to transmit respective light source characteristics 120 to the VLC communicator 115. In one embodiment, the VLC light sources 135 and 145 include respective controllers which identify the current characteristics of the light sources (which may be stored in memory in the light sources) and transmit those characteristics using the VLC data signals 140 and 150 which are stored by the VLC communicator 115 as the light source characteristics 120 which can include the color, specularity, beam spread, brightness, or illumination pattern (e.g., a flickering pattern) of the light sources 135 and 145. In this manner, the AR system 105 is made aware of the ambient light in the real world environment generated by the VLC light sources 135 and 145. The AR generator 125 can use the light source characteristics 120 to generate the display characteristics 130 which control how the AR content 155 is displayed in the display 110. Simulating an effect of the light sources 135 and 145 on the AR content 155 may make the AR content 155 appear more like a physical object than a virtual object which can make the AR experience more immersive to the user.

In one embodiment, the VLC communicator 115 transmits VLC signals 170 to the VLC light sources 135 and 145. That is, the VLC light sources 135 and 145 can include photodetectors and demodulators to decode data carried in the VLC signals 170. The VLC signals 170 can includes instructions for changing the characteristics of the light sources 135 and 145 such as changing their brightness, color, or illumination pattern. In another example, the VLC communicator 115 can synchronize the light sources 135 and 145 such as causing them to use the same illumination pattern or turning one of the light sources off. Thus, in the embodiments herein, the AR system 105 can perform two-way VLC communication with the light sources 135 and 145 where both the AR system 105 and the light sources 135 and 145 transmit and receive VLC signals or one-way VLC communication where only the light sources 135 and 145 transmit VLC signals.

In one embodiment, the VLC communicator 115 can identify a location of the VLC light sources 135 and 145 in the environment 100. As such, the AR generator 125 can identify a relative location of the AR content 155 in the real world environment 100 to the light sources 135 and 145 which can affect the display characteristics 130 of the AR content 155. Moreover, the AR generator 125 can determine the location of shadows caused by the light sources 135 and 145 and the physical objects 160 and 165. The AR generator 125 can change the display characteristics 130 of the AR content 155 such that it appears to the user as if the AR content 155 (or a portion of the AR content 155) is within the shadow.

In one embodiment, the VLC communicator 115 and the AR generator 125 may be software applications executed using one or more processors in the AR system. In another embodiment, the VLC communicator 115 and AR generator 125 may be a mix of software and hardware components.

Figure 2:
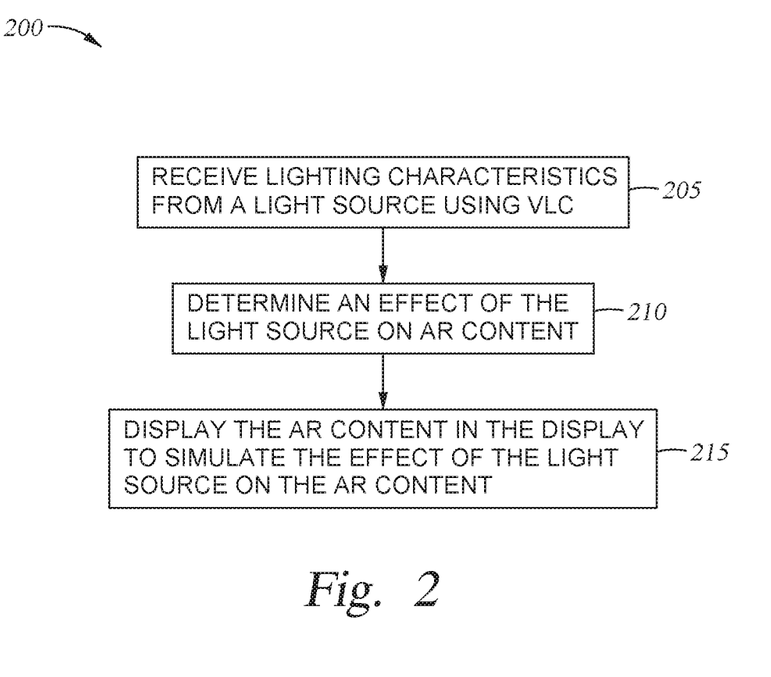
FIG. 2 is a flow chart for displaying AR content in response to ambient light in the real world environment, according to one embodiment described herein.

FIG. 2 is a flow chart of a method 200 for displaying AR content in response to ambient light in the real world environment, according to one embodiment described herein. At block 205, the VLC communicator in the AR system receives lighting characteristics from a light source using VLC. As mentioned above, the light source characteristics can include color, specularity, beam spread, brightness, or illumination pattern. In addition, the light source may indicate its type—e.g., whether a fluorescent bulb or an LED which may aid the AR system to determine how the light source contributes to the ambient light in the real world environment. For example, a LED at 80% brightness may have a different effect on ambient light than a fluorescent bulb at 80% brightness.

In one embodiment, the AR system receives the lighting characteristics from the light source once LOS communication with the light sources is established. For example, if the light source and the AR system are within different rooms separated by an opaque wall, the AR system may not receive any data signals from the VLC enabled light source. However, once the user moves into the same room as the light source, VLC communication can begin. One advantage of using VLC is that it uses LOS communication which helps to ensure the user is in (or viewing) an environment that has ambient light generated by the light source. In contrast, if radio frequency (RF) communication was used, the RF signals could pass through walls, and thus, it may be more difficult to determine if the user is currently viewing an environment that is affected by the light source. In one embodiment, the photodetector used for detecting the VLC signals in the AR system can be mounted in a same direction viewed by the user to further increase the likelihood that the user is viewing a real world environment that is affected by the light emitted by the light source.

In one embodiment, the light source continually transmits the VLC signals such that anytime an AR system is within LOS of the light source, the AR system can receive the lighting characteristics transmitted by the light source. Thus, when an AR system enters the same room as the light source (or comes close enough to the light source so that VLC is established), the AR system can immediately receive the lighting characteristics. Thus, method 200 may have much quicker response times than an AR system that attempts to detect and characterize ambient light in the environment without communicating with the light sources. For example, method 200 may require less computing power and time to characterize the ambient light when compared to an AR system that uses cameras and post processing to derive ambient lighting conditions. As such, method 200 may result in less latency when rendering the AR content on the display.

In one embodiment, a VLC light source can transmit lighting characteristics for a non-VLC light source to the AR system. For example, the lighting characteristics for the non-VLC light source can be communicated to the VLC light source which then forwards those characteristics to the AR system. In one embodiment, the VLC and the non-VLC light sources may be coupled via a mesh communication network so the lighting characteristics of the non-VLC light source can be communicated to the VLC light source.

However, in another embodiment, the VLC light source is not communicatively coupled to the non-VLC light source. In that scenario, a lighting designer (e.g., the person who sets up and arranges the light sources in the environment) may store the lighting characteristics of the non-VLC light source in a memory element in the VLC light source so that the VLC light source can transmit its lighting characteristics and the characteristics of the non-VLC light source to the AR system.

At block 210, the AR generator determines a simulated effect of the light source on the AR content. That is, AR generator determines how the light emitted by the light sources would affect the AR content if the AR content were actually a physical object in the real world environment. For example, if at block 205 the light source informs the AR system that it is flickering to simulate a candle or a strobe light, the AR generator changes the brightness of the AR content in tandem with the flickering of the light source. As such, the luminance of the AR content more closely matches the luminance of a physical object that is struck by the light emitted by the light source.

In another example, the AR system can change the display characteristics of the AR content by combining the lighting characteristics received from a plurality of light sources. For example, the real world environment may include a first light source that emits white light, a second light source that emits blue light, and a third light source that emits red light. The AR generator may weight these light sources using their current brightness to determine the color or hue used to display the AR content. For example, if the blue light is the brightest, the AR generator may display the AR content with more of a blueish hue which is more likely to match the color of the physical objects in the environment. In one embodiment, the AR generator may also consider a location of the AR content relative to the light sources when combining the lighting characteristics of the light sources. The location of the light sources may be predefined (i.e., already known to the AR system) or may be determined by the AR system as described in later embodiments.

At block 215, the AR generator displays the AR content in the display to simulate the effect of the light source on the AR content. That is, the AR generator can set the display characteristics of the AR content to better match the illumination of the physical objects in the real world environment. The AR generator can set the color, hue, specularity, brightness, or illumination pattern in response to the lighting characteristics received from the VLC light source.

In one embodiment, the method 200 can be performed using one-way communication where the AR system receives VLC signals emitted by the light source but where the AR system does not emit VLC signals to the AR system. Thus, the communication system can be simplified since the AR system does not need a light source to transmit VLC signals and the light sources do not need receivers (e.g., detectors and demodulators). However, the method 200 can be performed using an AR system and light sources that can perform two-way VLC communication.

Figure 3:
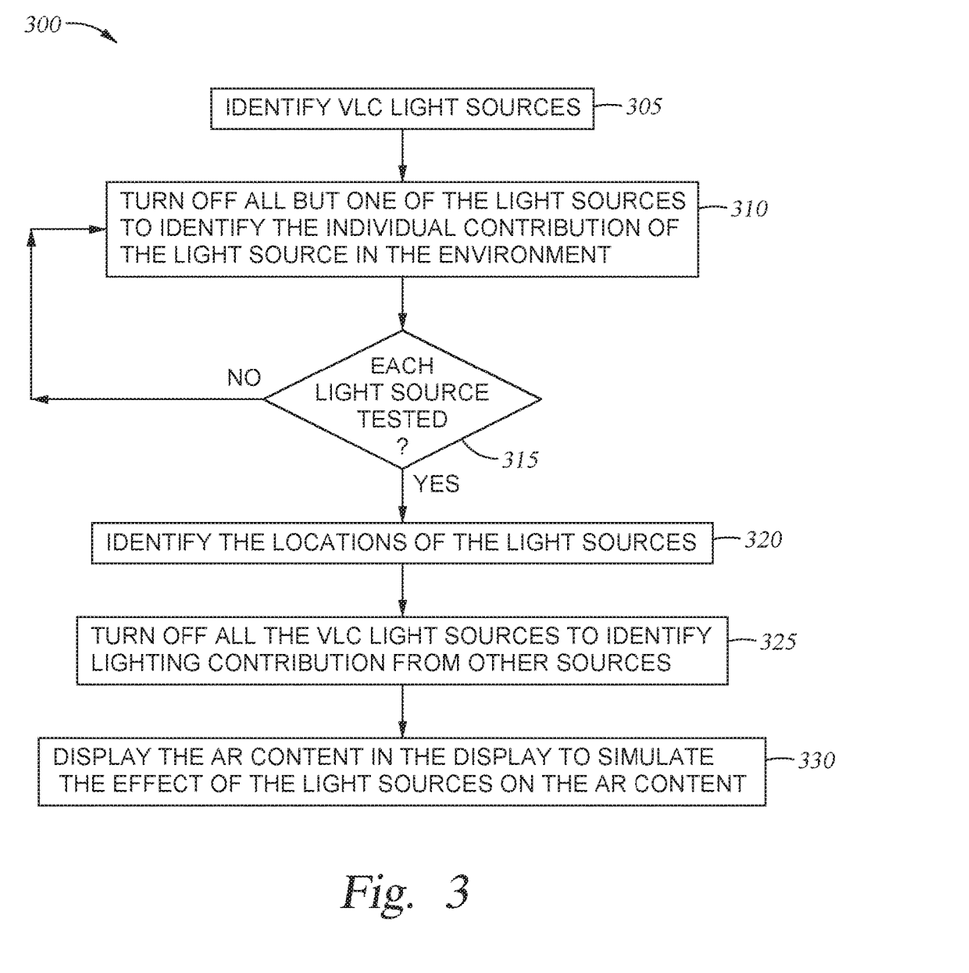
FIG. 3 is a flow chart for displaying AR content in response to ambient light emitted by multiple light sources in the real world environment, according to one embodiment described herein.

FIG. 3 is a flow chart of a method 300 for displaying AR content in response to ambient light emitted by multiple light sources in the real world environment, according to one embodiment described herein. At block 305, the AR system identifies the VLC light sources in a real world environment. For example, the AR system may receive lighting characteristics from a plurality of light sources.

At block 310, the AR system turns off all but one of the light sources to identify the individual contribution of the light source to the environment. That is, the AR system can send VLC signals to the light sources to instruct all but one of the light sources to turn off to determine how that light source affects the physical objects in the real world environment. The light sources can turn off for only a fraction of a second (e.g., less than a millisecond) and thus, this flicker would not be detected by the user. That is, the user would not notice that some of the light sources turned off.

When all but one of the light sources is off, the AR system can use a camera to capture an image of the real world environment. The AR system can use post processing to evaluate the image (or images) to determine the individual contribution to the ambient light in the environment. For example, the AR system can identify the color of the physical objects when the one light source is illuminated, the luminance of the physical objects, and any shadows cast by the light source. To do so, the AR system may use image processing techniques which identify the objects in the image and determines the luminance of those objects. In this manner, the AR system can identify the individual contribution or effect the light source has on the physical objects in the environment. However, the AR system may only post process the image or images of the real world environment once (or at intervals) rather than having to process each image when adjusting the AR content.

At block 315, the AR system determines if each VLC light source has been tested to determine its individual contribution to the ambient light in the real world environment. In one embodiment, the AR system uses the individual contributions of the light sources to build a lighting model for mapping the real world environment. The lighting model may indicate the contribution that each light source has at a plurality of locations in the real world environment. For example, the AR system may divide the real world environment into a 3D grid of blocks or pixels where the effects of the light sources on each of the blocks are determined by the individual contributions identified at block 310. For example, if a physical object is between one of the light sources and a location in the grid, the effect of the light source on that location in the grid may be low since that location is in the shadow of the physical object. However, if another light source can directly emit light to the location, the effect of that light source at that location may be greater. Using the light model, the AR generator can determine the display characteristics of the AR content by correlating the location of the AR content in the real world environment to the 3D grid of blocks.

Although capturing and processing images in order to determine the individual contributions of the light sources is compute intensive, in method 300, the AR system may perform the method only once when the AR system receives lighting characteristics from a light source it previously was not in communication with. That is, the AR system may determine the lighting model when the user first walks into the environment and the AR system begins to communicate with the VLC light sources in that environment. Thus, the AR system does not need to continually update the lighting model in order to render the AR content. In another embodiment, the VLC light sources can transmit predefined settings or characterizations to the AR system rather than the AR system generating the lighting mode by processing the images. For example, the VLC light sources can transmit data indicating how each light source affects the surrounding environment. Although relying on the predefined settings or characterizations may be less accurate than processing the captured images, doing so avoids the additional compute resources and time required to process the images.

In one embodiment, the AR system uses a depth of field, time of flight, or infrared sensors to identify the location of physical objects in the environment and their relative location to the AR system. Doing so may enable the AR system to better identify shadows and when determining the effect of each of the light sources on the 3D grid of blocks or pixels in the lighting model.

Once the individual contributions of the light sources are determined, the method 300 proceeds to block 320 where the AR generator identifies the locations of the light sources. In one embodiment, the AR generator can compare the images captured at block 310 when each light source was on while the other light sources where turned off. The locations in the images where the luminance changed the most between images (e.g., where a light source was on and then turned off, or vice versa) may correspond to a location of a light source in the environment.

Once the locations of the light sources are known, the AR generator can update the display characteristics of the AR content by correlating a location of the AR content to the locations of the light source. For example, as the AR content moves closer to a light source, the AR generator may increase the luminance of the portion of the AR content that is facing the light source. Further, the location of the light sources may be used in combination with the lighting model generated at block 310. For example, the AR generator may use the lighting model to determine if the AR content is in a shadow of a physical object, and thus, ignore (or reduce) the effect the occluded light source has on the AR content and use the distance between the AR content and the non-occluded light sources to determine the display characteristics of the AR content.

At block 325, the AR system turns off all the VLC light sources to identify a contribution to the ambient light from other sources. That is, the ambient light in the real world environment may be determined by other light sources besides VLC light sources. For example, the environment may include a window or skylight that permits natural light to illuminate the physical objects. Moreover, the real world environment can include other non-intelligent light sources (e.g., light sources that cannot communicate with the AR system) which cannot be turned off by the AR system. The AR system can measure the contribution from these light sources which can also be considered in the lighting model. For example, the non-intelligent light source may establish a baseline luminance value for the blocks in the 3D grid.

At block 330, the AR generator displays the AR content in the display to simulate the effect of the light sources on the AR content. The display characteristics of the AR content can vary depending on the VLC light sources in the environment (e.g., the intelligent light sources which can communicate with the AR system), the non-intelligent light sources (e.g., the sun or conventional lighting systems), and the location of the AR content relative to the locations of the light sources. Moreover, the display characteristics of the AR content may vary for different portions of the AR content. For example, different portions of the AR content may be located in different blocks or pixels in the lighting model. For example, a first arm of a virtual cartoon character may be located in a portion of the real world environment that is strongly effected by natural light entering in through a window while the other arm of the cartoon character is located in a portion of the environment that is primarily illuminated by a VLC light source. Using the lighting model and the locations of the AR content relative to the light sources, the AR generator can change the display characteristics of the first arm to appear as if being illuminated by natural light while the second arm is being illuminated by the VLC light source.

Figure 4A:
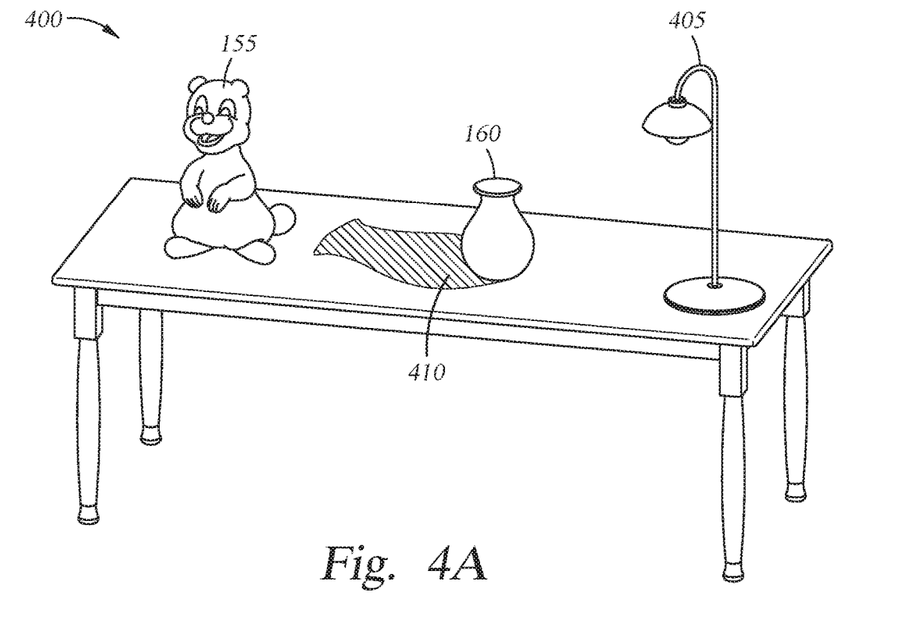
FIGS. 4A and 4B illustrate changing the lighting characteristics of AR content as the AR content moves in the real world environment, according to one embodiment described herein.
Figure 4B:
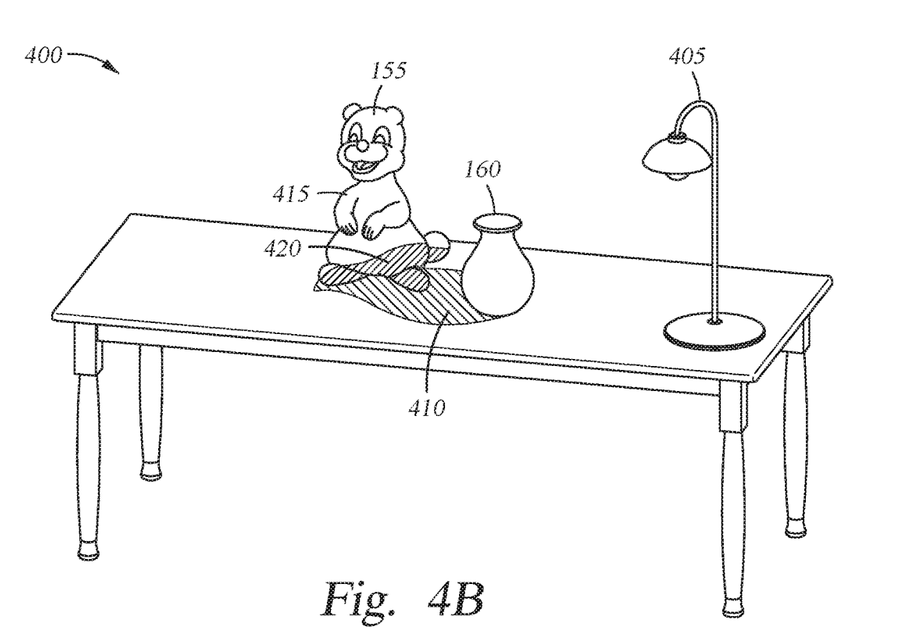

FIGS. 4A and 4B illustrate changing the lighting characteristics of AR content as the AR content moves in the real world environment, according to one embodiment described herein. FIG. 4A illustrates a real world environment 400 in which the AR content 155 is being displayed to a user looking through a display in an AR system. That is, the AR system determines a location (and size) of the AR content 155 in the display which, to the perspective of the user, inserts the AR content 155 at a desired or simulated location in the real world environment 400.

Using method 300, the AR system can determine that a VLC light source 405 casts a shadow 410 when illuminating the physical object 160. That is, by evaluating the individual contribution of the VLC light source 405, the AR system can determine that there is a shadow 410 in a particular region of the environment 400 where the light source 405 has little effect on physical objects. However, because the AR content 155 is outside of the shadow 410 (i.e., the physical object 160 is not directly between the simulated location of the AR content 155 and the VLC light source 405 in the real world environment 400, the AR system determines the display characteristics of the AR content 155 to simulate the AR content being directly illuminated by the light source 405.

However, in FIG. 4B, the AR generator has moved the AR content 155 in the display such that the simulated location of the AR content 155 in the real world environment 400 is now within the shadow 410. Specifically, a lower portion 420 of the AR content 155 is in the shadow 410 cast by the physical object 160 while an upper portion 415 of the AR content 155 is not in the shadow 410.

As shown by the hashing in FIG. 4B, the lower portion 420 has a lesser luminance or brightness relative to the upper portion 415. Stated differently, the AR generator determines that the light emitted by the VLC light source 405 has a lesser effect on the lower portion 420 than the upper portion 415 which is not occluded by the physical object 160. Instead, the luminance of the portion 420 may be determined primarily by other light sources (not shown) in the environment 400. Thus, when displaying the AR content 155, the AR system controls the display such that the pixels that output the lower portion 420 have a lower luminance than the pixels outputting the upper portion 415.

In addition to determining that the lower portion 420 is in the shadow 410, the AR system may increase the brightness of the upper portion 415 relative to the brightness of that same portion when the AR content 155 was at the simulated position shown in FIG. 4A. That is, as the AR content 155 moves closer to the VLC light source 405, the portion of the AR content 155 that is directly illuminated by the light source 405 (e.g., the portion that is not occluded by any physical objects) increases in brightness. In this manner, the AR system can use the lighting model and the relative distance between the AR content 155 and the light sources to set the display characteristics of different portions of the AR content 155.

Figure 5:
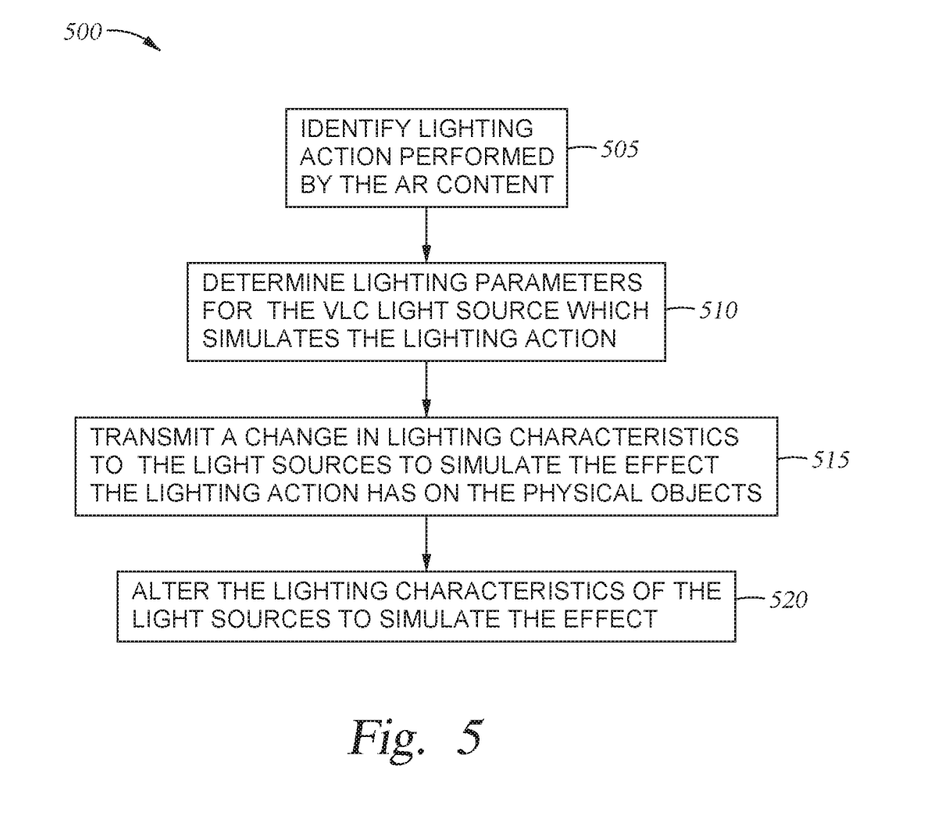
FIG. 5 is a flow chart for changing the light source characteristics in response to a lighting action in the AR content, according to one embodiment described herein.

FIG. 5 is a flow chart of a method 500 for changing the light source characteristics in response to a lighting action in the AR content, according to one embodiment described herein. For clarity, the method 500 is discussed in parallel with FIGS. 6A and 6B which illustrate AR content changing a characteristic of a light source in the real world environment, according to one embodiment described herein.

Figure 6A:
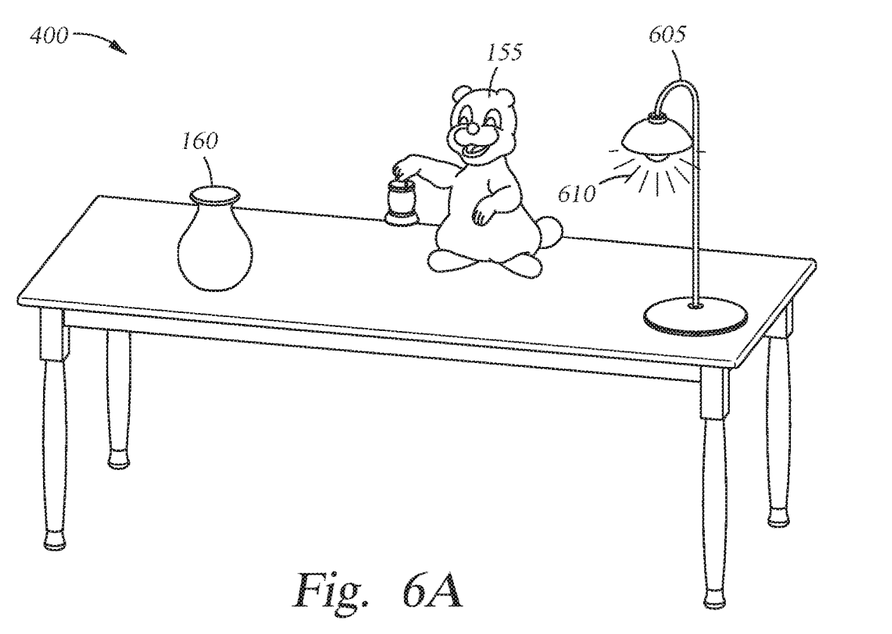
FIGS. 6A and 6B illustrate AR content changing a characteristic of a light source in the real world environment, according to one embodiment described herein.
Figure 6B:
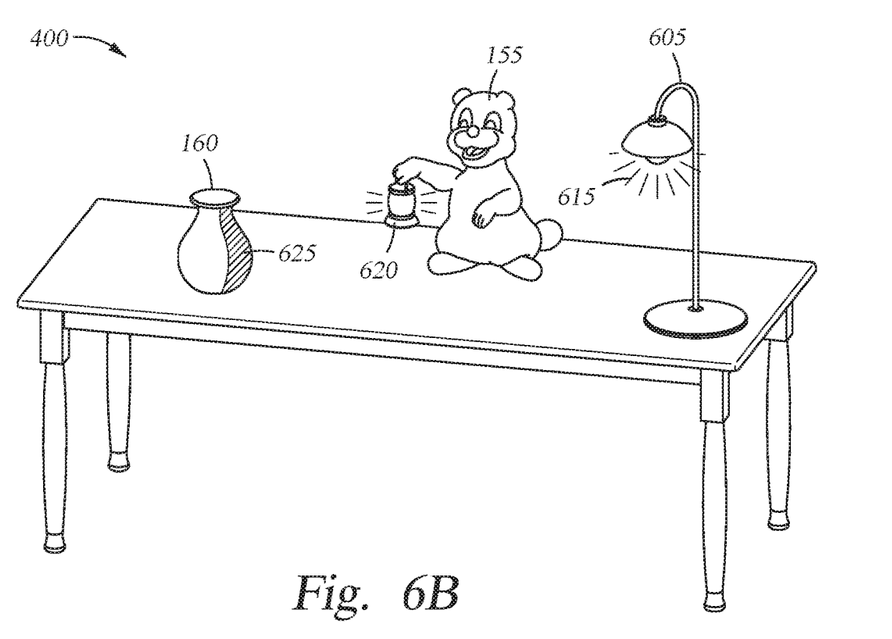

At block 505, the AR system identifies a lighting action performed by the AR content. The lighting action is a simulated action which is displayed only to the user using the display in the AR system. For example, the AR content may include an animation of a cartoon character lighting a fire, shooting a flare, or turning on a virtual light source (e.g., a light bulb). The AR content could also include an animation of rising sun (which can be displayed in a physical window in the real world environment) or a gas fireplace being turned on. Generally, the lighting action can be any AR content that would emit light. As shown in FIG. 6B, the AR content performs a lighting action 620 where the AR content 155 (e.g., a virtual cartoon character) lights a lamp. The lighting action 620 would be seen by the user who is viewing the real world environment 600 through the display, but not by anyone viewing the real world environment without an AR headset.

The AR system can change the display characteristics of the AR content 155 to simulate the light emitted by performing the lighting action 620. That is, when the lamp is lit in FIG. 6B, the AR generator can increase the illuminance on the side of the virtual character facing the torch to simulate the lamp emitting light which is reflected off of the virtual character. Or the AR generator can change the color or hue of the side of the virtual character facing the lamp (e.g., make the side more bluish) to reflect the color of light emitted by the lighting action 620. Although the AR system can update the AR content 155 to simulate light being emitted by the lamp, the system may be unable to also simulate the lighting action 620 emitting light which strikes the physical objects in the real world environment 600. However, method 500 provides a technique for also simulating the effects of the lighting action 620 on the physical objects—e.g., physical object 160.

At block 510, the AR system determines lighting parameters for the VLC light sources in the environment which simulate the lighting action. In one embodiment, the AR system determines the color of the light emitted by the lighting action. For example, the lamp shown in FIG. 6B may emit bluish light. However, if the lighting action was lighting a torch, the light may be reddish orange to simulate the glow of a fire. If the lighting action was shooting a flare, then the light may be white. In another example, the lighting action may be fireworks which include a mix of different colors. In addition to color, the AR system may determine an intensity of the simulated light. For example, the torch may have a lower intensity than a lighting action of a sun rising or shooting a flare.

In one embodiment, the AR system determines the distance between the simulated location of the lighting action in the AR content to the actual locations of the VLC light sources in the real world environment. The AR system may identify the light sources that are closest to the simulated location of the lighting action. Changing the lighting characteristics of a light source closest to the lighting action may better simulate the effect of the lighting action on the physical objects in the real world environment.

At block 515, the AR system transmits a change in lighting characteristics to the light sources in the real world environment to simulate the lighting action affecting the physical objects. In one embodiment, the AR system transmits a VLC signal that includes an instruction for causing the receiving light source to change its color, specularity, beam spread, brightness, or illumination pattern in order to simulate the lighting action in the AR content. That is, the AR system controls one or more of the VLC light sources in the real world environment to illuminate the environment as if the lighting action was a physical rather than a virtual action.

At block 520, the VLC light sources alter their lighting characteristics to simulate the effect of the lighting action in the real world environment. As shown in FIG. 6A, a VLC light source 605 has a first illumination 610 which illuminates the physical object 160 which is viewable by the user wearing the AR system. In FIG. 6B, the AR system has instructed the VLC light source 605 to change from the first illumination 610 to a second illumination 615 which simulates an effect of the lighting action 620 on the physical object 160. In this example, the second illumination causes a change in brightness on a portion 625 of the physical object 160 that is facing the AR content 155 as illustrated by the hashing. For example, the second illumination 615 may be brighter or be a different color than the first illumination 610 in order to affect the portion 625 as if the lighting action 620 was a physical light source rather than a virtual one performed in the display of the AR system. Moreover, in another example, if the lighting action 620 flickers (e.g., a flame whose intensity changes or a flashing light), the AR system can cause the brightness of the VLC light source 605 to vary in tandem with the lighting action 620 such that the illumination of the portion 625 changes with the flickering of the lighting action 620.

The user who is viewing the physical object 160 through a transmissive portion of the display sees the change of illumination on the portion 625 of the physical object 160 which appears to be caused by the lighting action 620. In this manner, the AR system can make it appear as if lighting actions performed by the AR content 155 affect the appearance of the physical objects in the real world environment 600.

Figure 7:
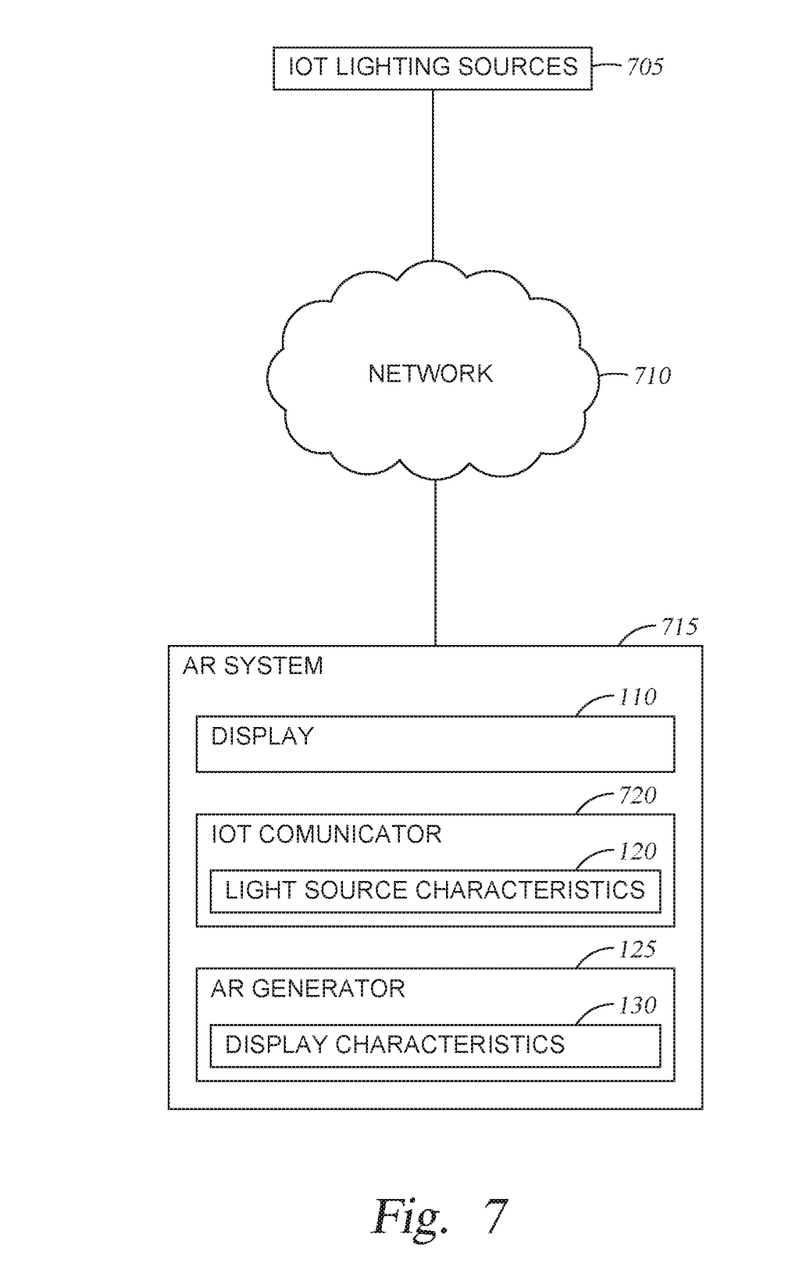
FIG. 7 is a system diagram of an AR system communicating with light sources to display AR content, according to one embodiment described herein.

FIG. 7 is a system diagram of a real world environment 700 which includes an AR system 715 communicating with IoT light sources 705 to display AR content, according to one embodiment described herein. In FIG. 7, the AR system 715 communicates with light sources using an IoT communication technique rather than VLC. The IoT light sources 705 and the AR system 715 are coupled to a network 710 (e.g., a local access network or a wide access network such as the Internet). For example, the IoT light sources 705 and the AR system 715 may include wired or wireless means for communicating with the network 710. Like with using VLC, the IoT light sources 705 can transmit their light source characteristics 120 to the AR system 715 which are received by an IoT communicator 720. As described above, the AR generator 125 can use the light source characteristics 120 to generate display characteristics 130 which simulate an effect of the light sources 705 on AR content outputted in the display 110. Put differently, the AR system 715 can perform similar functions as described above except using IoT rather than VLC to communicate.

One difference between using IoT rather than VLC, however, is that IoT is a not a LOS communication method. Thus, it may be more difficult to determine if the AR system 715 is in the same physical environment as the light sources 705. To compensate, the AR system 715 may include a location system such as GPS or an indoor infrared location system which can identify a geographic location of the AR system 715. The IoT light sources 705 may also transmit their geographic location via the network 710, and in this manner, the AR system 715 can determine if it is in the same location (e.g., a same room or within a predefined distance) as the light sources 705.

The AR system 715 can perform the methods 200, 300, and 500 as described above except using IoT to communicate rather than VLC. For example, the AR system 715 can selectively turn off all but one of the IoT light sources 705 to determine an individual contribution of the light sources 705 on the ambient light and to determine a location of the light sources 705 in the environment (if not already known) as described in the method 300. The AR system 715 can also transmit instructions to the light sources via the network 710 to simulate a lighting action in the AR content affecting physical objects in the real world environment as described in method 500.

In one embodiment, the AR system 715 can use a mix of VLC and IoT communication. That is, the light sources 705 may be capable of both VLC and IoT communication. For example, the AR system 715 may use VLC in order to first identify or detect the light sources 705 in the environment since doing so relies on LOS which may make it easier to determine when the AR system 715 and the light sources 705 are in the same physical environment. Once identified, the AR system 715 can use a unique identifier (e.g., an IP address) transmitted using VLC to communicate with the light sources 705 using an IoT communication technique via the network 710.

In the preceding, reference is made to embodiments of the invention. However, it should be understood that the invention is not limited to specific described embodiments. Instead, any combination of the features and elements discussed above, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a computer readable storage medium may be any tangible medium that can contain, or store a program for use by or in connection with an instruction execution system, apparatus, or device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An augmented reality (AR) system, comprising:
   a display configured to output AR content to overlay a portion of a real world environment viewable through the display;
   a visible light communication (VLC) communicator configured to receive VLC signals transmitted from a VLC light source in the real world environment, wherein the VLC signals comprise data indicating light source characteristics of the VLC light source; and
   an AR generator configured to:
      determine, based on the light source characteristics, display characteristics for the AR content to simulate an effect of the VLC light source on the AR content; and
      identify a respective location of a plurality of VLC light sources, which includes the VLC light source, in the real world environment, wherein the display characteristics for the AR content are determined based on a distance between a simulated location of the AR content in the real world environment and the respective location of at least one of the plurality of VLC light sources.

2. The AR system of claim 1, wherein the VLC communicator is configured to:
   transmit VLC signals to a plurality of VLC light sources in the real world environment to repeatedly turn off all but one of the plurality of VLC light sources until each of the plurality of VLC light sources has been turned on in isolation,
   wherein the AR system is configured to identify an individual contribution of the VLC light sources on ambient light in the real world environment.

3. The AR system of claim 2, wherein the AR generator is configured to:
   identify a shadow caused by at least one of the plurality of VLC light sources in the real world environment; and
   upon determining a simulated location of the AR content is within a location of the shadow in the real world environment, update the display characteristics for the AR content to simulate an effect of the at least one of the plurality of VLC light sources on the AR content.

4. The AR system of claim 1, wherein the light source characteristics comprises a flickering pattern performed by the VLC light source, wherein simulating the effect of the VLC light source on the AR content comprises:
   changing the display characteristics for the AR content in tandem with the flickering pattern of the VLC light source.

5. The AR system of claim 1, wherein the AR generator is configured to:
   identify a lighting action in the AR content, and determine a lighting parameter for the VLC light source to simulate an effect of the lighting action on a physical object in the real world environment, wherein the VLC communicator is configured to transmit VLC signals to the VLC light source to change the light source characteristics of the VLC light source based on the lighting parameter to simulate the lighting action in the real world environment.

6. The AR system of claim 5, wherein the lighting action is an animation outputted in the display.

7. A non-transitory computer-readable storage medium having computer-readable program code embodied therewith, the computer-readable program code, when executed by a processor, performs an operation, the operation comprising:

outputting AR content in a display, wherein the AR content overlays a portion of a real world environment viewable through the display;

receiving data transmitted from a VLC light source in the real world environment using VLC signals, wherein the data comprises light source characteristics of the VLC light source;

determining, based on the light source characteristics, display characteristics for the AR content to simulate an effect of the VLC light source on the AR content; and identifying a respective location of a plurality of VLC light sources, which includes the VLC light source, in the real world environment, wherein the display characteristics for the AR content are determined based on a distance between a simulated location of the AR content in the real world environment and the respective location of at least one of the plurality of VLC light sources.

8. The computer-readable storage medium of claim 7, wherein the operation comprises:

transmitting VLC signals to a plurality of VLC light sources in the real world environment to repeatedly turn off all but one of the plurality of VLC light sources until each of the plurality of VLC light sources has been turned on in isolation; and identifying an individual contribution of the VLC light sources on ambient light in the real world environment.

9. The computer-readable storage medium of claim 8, wherein the operation comprises:

identify a shadow caused by at least one of the plurality of VLC light sources in the real world environment; and upon determining a simulated location of the AR content is within a location of the shadow in the real world environment, updating the display characteristics for the AR content to simulate an effect of the at least one of the plurality of VLC light sources on the AR content.

10. The computer-readable storage medium of claim 7, wherein the light source characteristics comprises a flickering pattern performed by the VLC light source, wherein simulating the effect of the VLC light source on the AR content comprises:

changing the display characteristics for the AR content in tandem with the flickering pattern of the VLC light source.

11. The computer-readable storage medium of claim 7, wherein the operation comprises:

identifying a lighting action in the AR content, and determining a lighting parameter for the VLC light source to simulate an effect of the lighting action on a physical object in the real world environment, transmitting VLC signals to the VLC light source to change the light source characteristics of the VLC light source based on the lighting parameter to simulate the lighting action in the real world environment.

12. The computer-readable storage medium of claim 11, wherein the lighting action is an animation outputted in the display.

13. A communication system, comprising:

an intelligent light source; and an AR system, comprising:

a display configured to output AR content to overlay a portion of a real world environment viewable through the display;

a communicator configured to receive signals transmitted from the intelligent light source, wherein the signals comprise data indicating a light source characteristic of the intelligent light source; and an AR generator configured to:

determine, based on the light source characteristic, display characteristics for the AR content to simulate an effect of the intelligent light source on the AR content; and identify a respective location of a plurality of intelligent light sources, which includes the intelligent light source, in the real world environment, wherein the display characteristics for the AR content are determined based on a distance between a simulated location of the AR content in the real world environment and the respective location of at least one of the plurality of intelligent light sources.

14. The communication system of claim 13, wherein the intelligent light source is configured to use VLC to transmit the signals to the AR system.

15. The communication system of claim 13, wherein the intelligent light source is configured to use an Internet of Things (IoT) communication protocol to transmit the signals to the AR system.

16. The communication system of claim 13, wherein the communicator is configured to:

transmit signals to a plurality of intelligent light sources in the real world environment to repeatedly turn off all but one of the plurality of intelligent light sources until each of the plurality of intelligent light sources has been turned on in isolation, wherein the AR system is configured to identify an individual contribution of the intelligent light sources on ambient light in the real world environment.

17. The communication system of claim 13, wherein the AR generator is configured to:

identify a lighting action in the AR content, and determine a lighting parameter for the intelligent light source to simulate an effect of the lighting action on a physical object in the real world environment, wherein the communicator is configured to transmit signals to the intelligent light source to change the light source characteristic of the intelligent light source based on the lighting parameter to simulate the lighting action in the real world environment.

18. An augmented reality (AR) system, comprising:

a display configured to output AR content to overlay a portion of a real world environment viewable through the display;

a visible light communication (VLC) communicator configured to receive VLC signals transmitted from a VLC light source in the real world environment, wherein the VLC signals comprise data indicating light source characteristics of the VLC light source; and an AR generator configured to:

determine, based on the light source characteristics, display characteristics for the AR content to simulate an effect of the VLC light source on the AR content;

identify a lighting action in the AR content; and determine a lighting parameter for the VLC light source to simulate an effect of the lighting action on a physical object in the real world environment, wherein the VLC communicator is configured to transmit VLC signals to the VLC light source to change the light source characteristics of the VLC light source based on the lighting parameter to simulate the lighting action in the real world environment.

* * * * *

UNITED STATES PATENT AND TRADEMARK OFFICE
CERTIFICATE OF CORRECTION

PATENT NO. : 10,438,404 B2
APPLICATION NO. : 15/783247
DATED : October 8, 2019
INVENTOR(S) : Robert Scott Trowbridge Page 1 of 1

It is certified that error appears in the above-identified patent and that said Letters Patent is hereby corrected as shown below:

In the Drawings

Drawing sheet 1 of 7, in Figure 1, reference numeral 115, Line 1, delete "COMUNICATOR" and insert -- COMMUNICATOR --, therefor.

Drawing sheet 7 of 7, in Figure 7, reference numeral 720, Line 1, delete "COMUNICATOR" and insert -- COMMUNICATOR --, therefor.

Signed and Sealed this
Twenty-first Day of January, 2020

Andrei Iancu
*Director of the United States Patent and Trademark Office*